(12) United States Patent
Hunter et al.

(10) Patent No.: US 9,175,993 B2
(45) Date of Patent: Nov. 3, 2015

(54) INDUSTRIAL PROCESS FIELD DEVICE WITH LOW POWER OPTICAL ISOLATOR

(71) Applicant: Rosemount Inc., Chanhassen, MN (US)

(72) Inventors: Kirk Allan Hunter, Shakopee, MN (US); Jordan Dennis Lucht, Maple Grove, MN (US); Jared James Dreier, Chaska, MN (US); Bruce David Rovner, Minneapolis, MN (US); Tim Scott Lemke, Monticello, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 14/038,117

(22) Filed: Sep. 26, 2013

(65) Prior Publication Data

US 2015/0082907 A1 Mar. 26, 2015

(51) Int. Cl.
*G01F 1/58* (2006.01)
*G01F 1/60* (2006.01)
*H04B 10/80* (2013.01)

(52) U.S. Cl.
CPC .............. *G01F 1/60* (2013.01); *H04B 10/801* (2013.01); *G01F 1/58* (2013.01); *G01F 1/588* (2013.01); *G05B 2219/15133* (2013.01); *G05B 2219/25458* (2013.01)

(58) Field of Classification Search
CPC ............ G01F 1/58; G01F 1/588; G01F 1/584
USPC .............................. 73/861.02, 861.08–861.16
See application file for complete search history.

(56) References Cited

U.S. PATENT DOCUMENTS

| | | | | |
|---|---|---|---|---|
| 5,639,970 | A | * | 6/1997 | Schulz ...................... 73/861.12 |
| 5,995,252 | A | * | 11/1999 | Nemer et al. ................. 250/551 |
| 6,555,935 | B1 | | 4/2003 | Maskovyak et al. |
| 6,657,476 | B1 | * | 12/2003 | Bicking ....................... 327/341 |

(Continued)

FOREIGN PATENT DOCUMENTS

| | | |
|---|---|---|
| DE | 10 2009 008 087 | 8/2010 |
| DE | 10 2010 012 064 | 9/2011 |

(Continued)

OTHER PUBLICATIONS

High-speed Switching Transistor Handbook, Motorola, edited by William D. Roehr, 1963.*

(Continued)

*Primary Examiner* — Lisa Caputo
*Assistant Examiner* — Nathaniel T Woodward
(74) *Attorney, Agent, or Firm* — Westman, Champlin & Koehler, P.A.

(57) ABSTRACT

An industrial process control field device includes a process variable transducer configured to sense or control a process variable. Field device circuitry is configured to couple to the process variable transducer and communicate information related to the process variable to another location. The field device circuitry includes an optical isolator having transmit circuitry on a first side of a galvanic isolation configured to transmit an optical signal which is pulsed on and off across the isolation. Receive circuitry is located on a second side of galvanic isolation and configured to receive the optical signal with an optical sensor. The optical sensor enters an "on" state when it receives a pulse and is otherwise in an "off" state. The receive circuitry provides a secondary side output based upon the received optical signal. The receive circuitry enters in a low power state when the optical sensor is in the "off" state.

14 Claims, 4 Drawing Sheets

(56) References Cited

U.S. PATENT DOCUMENTS

| | | |
|---|---|---|
| 7,019,318 B2 | 3/2006 | Breinlinger |
| 7,619,418 B2 | 11/2009 | Schulz et al. |
| 7,714,562 B2 * | 5/2010 | Oswald et al. ............... 323/288 |
| 2004/0181358 A1 | 9/2004 | Youngquist |
| 2008/0074309 A1 | 3/2008 | Nilsson |
| 2008/0258736 A1 | 10/2008 | Schulz et al. |
| 2010/0155627 A1 | 6/2010 | Baumgartner et al. |
| 2013/0197818 A1 | 8/2013 | Karbula et al. |
| 2013/0240764 A1 | 9/2013 | Kravitz |

FOREIGN PATENT DOCUMENTS

| | | |
|---|---|---|
| WO | WO 01/39515 | 5/2001 |
| WO | WO 2010/043876 | 4/2010 |

OTHER PUBLICATIONS

Notification of Transmittal of the International Search Report and the Written Opinion of the International Searching Authority for PCT/US2014/052467, dated Nov. 20, 2014.

Notification of Transmittal of the International Search Report and the Written Opinion of the International Searching Authority for PCT/US2014/049554, dated Nov. 26, 2014.

Notification of Transmittal of the International Search Report and the Written Opinion of the International Searching Authority for PCT/US2014/050512, dated Nov. 12, 2014.

* cited by examiner

INDUSTRIAL PROCESS FIELD DEVICE WITH LOW POWER OPTICAL ISOLATOR

BACKGROUND

The present invention relates to industrial process field devices which are used to measure or control process variables of an industrial process. More specifically, the present invention relates to an industrial process field device which includes an optical isolator to isolate components within the field device.

An optical isolator, also known as an opto-isolator, optocoupler, or photo coupler, is an arrangement of electrical components that transfers electrical signals between two isolated circuits using electromagnetic radiation including visible light and infrared radiation. This isolation prevents large voltages induced or otherwise present in one of the circuits from being transferred or coupled to the other circuit. Optical isolators cannot supply power between the circuits, but can convey signals between the isolated circuits. As can be appreciated, optical isolators enjoy widespread use in a variety of electronics where isolation is desired.

One particular electronic device that employs optical isolators is known as a field device. Field devices are used by the process control and measurement industry for a variety of purposes. Usually, such field devices have a field-hardened enclosure so that they can be installed in relatively rugged environments and be able to withstand climatological extremes of temperature, humidity, vibration and mechanical shock. Field devices also typically operate on relatively low power. For example, some field devices are currently available that receive all of their operating power from a known 4-20 mA loop.

The environment within which the field devices operate can sometimes be highly volatile. Some environments may be so volatile that an errant spark or sufficiently high surface temperature of an electrical component could cause the environment to ignite and generate an explosion. In order to ensure that such situations do not occur, intrinsic safety specifications have been developed. Compliance with an intrinsic safety requirement helps ensure that even under fault conditions, the circuitry or device itself cannot ignite a volatile environment. Optical isolators can be used to isolate circuitry within a field device in order to meet intrinsic safety requirements. Isolated high speed communication between components in a field device typically requires high power optocouplers. However, in many field devices the available power is very limited. Further, optocouplers are typically not configured for use in accordance with intrinsic safety requirements and therefore require a relatively large separation between the transmitter and receiver of the optocoupler. This spacing reduces the speed of the device and requires additional power to span the distance.

SUMMARY

An industrial process control field device includes a process variable transducer configured to sense or control a process variable. Field device circuitry is configured to couple to the process variable transducer and communicate information related to the process variable to another location. The field device circuitry includes an optical isolator having transmit circuitry on a first side of a galvanic isolation configured to transmit an optical signal which is pulsed on and off across the isolation. Receive circuitry is located on a second side of galvanic isolation and configured to receive the optical signal with an optical sensor. The optical sensor enters an "on" state when it receives a pulse and is otherwise in an "off" state. The receive circuitry provides a secondary side output based upon the received optical signal. The receive circuitry enters in a low power state when the optical sensor is in the "off" state.

DETAILED DESCRIPTION OF ILLUSTRATIVE EMBODIMENT

In various aspects, an industrial process field device is provided which includes optical isolators which provide isolation between electrical components of the device. The optical isolators include transmit circuitry and receive circuitry. To reduce power consumption, the transmit and receive circuitry are configured to operate in a normally off or low power state. This configuration results in a lower power consumption than is typical in most field devices utilizing optocouplers. The circuitry can be optimized for different operating frequencies, duty cycles and voltage levels. The following discussion is directed to a field device in which data is transmitted through an optical isolator from measurement circuitry to output circuitry. However, the invention is not limited to this configuration. Further, a specific implementation is illustrated in connection with a magnetic flowmeter. However, the invention can be implemented in any field device in which isolation using optical isolators is desired.

Figure 1:
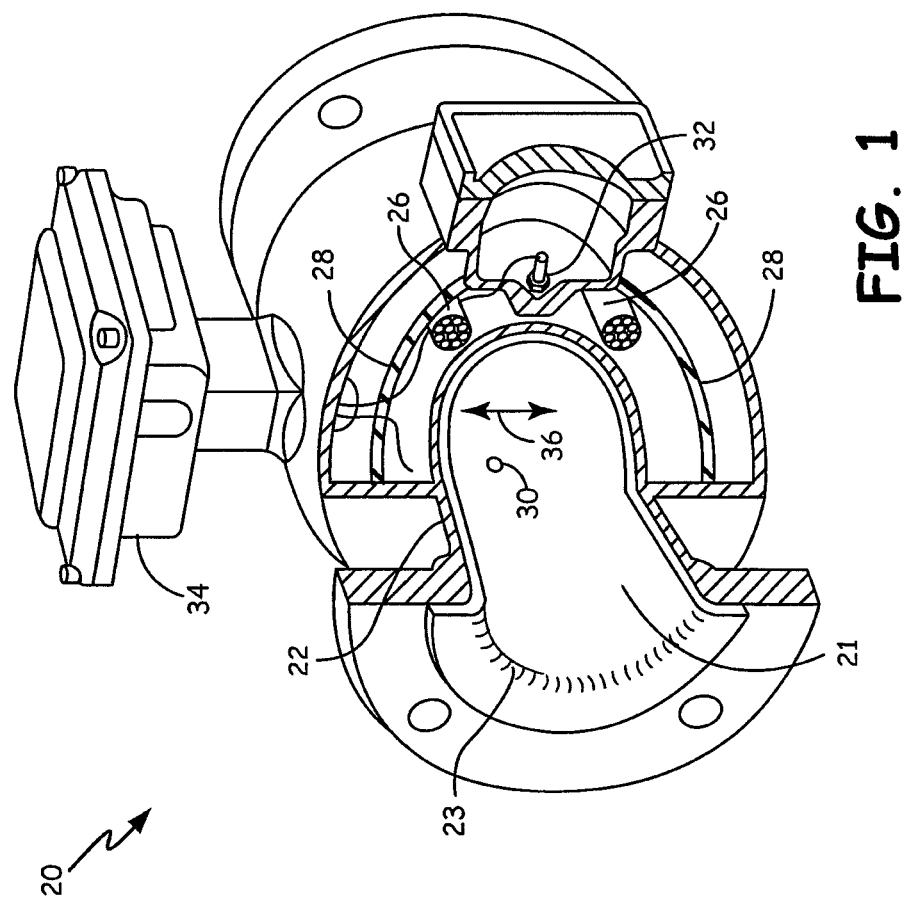
FIG. 1 is a partial cut away view of a magnetic flowmeter.

FIG. 1 is a partially cut away view of a magnetic flowmeter 20 in which embodiments of the present invention are particularly useful. Magnetic flowmeter 20 includes a flowtube 22 formed of low magnetic permeability material with an electrically insulating liner 23, an electromagnet 26 is formed by a coil, a ferromagnetic core or shield 28 and electrodes 30, 32. The electromagnet 26 and the electrodes 30, 32 are wired to a transmitter circuit 34. In operation, the transmitter circuit drives the electromagnet 26 with an electrical current, and the electromagnet 26 produces a magnetic field 36 indicated by arrows inside the flowtube 22. Process liquid 21 flows through the magnetic field in the flowtube 22, and the flow induces an electromotive force (EMF, voltage) in the liquid 21. The insulating liner 23 prevents leakage of the EMF from the liquid 21 to the metal flowtube 22. The electrodes 30, 32 contact the liquid 21 and pick up or sense the EMF which, according to Faraday's law, is proportional to the flow rate of the liquid 21 in the flowtube 22.

Figure 2:
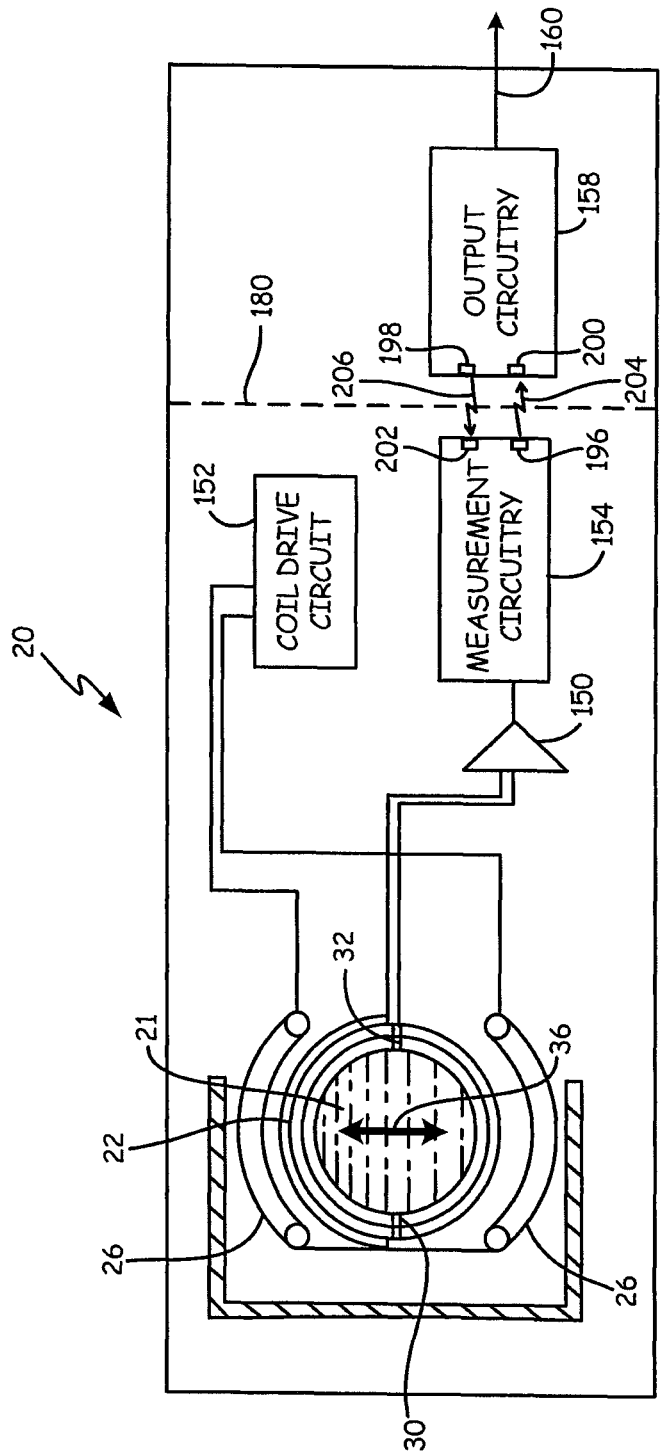
FIG. 2 is a simplified electrical schematic diagram of the magnetic flowmeter of FIG. 1.

FIG. 2 is a diagrammatic view of circuitry of magnetic flowmeter transmitter 20. The magnetic flowmeter 20 includes a flowtube 22 adapted to carry a flowing liquid 21 that is electrically coupled to the flowtube 22. Coils 26 are positioned proximate to the flowtube 22 to apply a magnetic field to the process fluid in response to a drive signal from drive circuitry 152. Electrodes 30 and 32 sense the EMF produced in fluid 21. The EMF is, related to the flow of fluid 21 and the applied magnetic field 36. Electrodes 30 and 32 couple to measurement circuitry 154 through differential amplifier 150. Measurement circuitry 154 provides an output related to flow in accordance with known techniques. Measurement circuitry 154 can include, for example, suitably programmed or configured microprocessor(s) or digital signal processor (DSP) circuitry.

The output of measurement circuitry 154 is provided to output circuitry 158 for transmission to control or monitoring circuitry remote from magnetic flowmeter 20. Output circuitry 158 provides a digital or analog output indicative of the flow rate of the process fluid 21. The output of output circuitry 158 is shown coupled to a process control loop 160. Loop 160 can be a current loop over which an analog and/or digital output are transmitted to control or monitoring circuitry generally located remotely from flowmeter 20. Example communication techniques include 4-20 mA or HART® current loops, FieldBus protocols, or others, and also includes wireless communication techniques such as the wirelessHART® communication protocol. In some configurations, power received from loop 160 is used to power some or all of the circuitry of transmitter 20.

In accordance with Intrinsic Safety design requirements, info nation related to a measured flow is sent from measurement circuitry 154 to output circuitry 158 across a galvanic isolation 180 using optical coupling techniques. Isolation 180 can be in accordance with Intrinsic Safety requirements and a portion of isolation 180 should be at least partially transparent to the electromagnetic radiation used by the optocouplers. The isolation can, for example, be accomplished by dividing the transmitter 20 housing into two sections using a physical bather. One section can house low power, intrinsically safe circuitry, while the other section can house higher power circuitry.

In this example, two optocouplers are used for bi-directional communication. In FIG. 2, a first optocoupler is formed by optical transmit circuitry 196 which transmits an optical signal 204 across isolation 180 to optical receive circuitry 200. A second optocoupler is formed by optical transmit circuitry 198 which transmits an optical signal 206 across isolation 180 to optical receive circuitry 202. However, a single transmit/receive circuit pair can be used for unidirectional communication, for example from measurement circuitry 154 to output circuit 158. Additionally, multiple pairs of transmit and receive circuits can be used for unidirectional or bi-directional communication. The use of optocouplers allows data to be transmitted between the two circuits 154, 158 without an electrical connection therebetween. In a typical magnetic flowmeter configuration, measurement circuitry and coil drive circuitry are powered with an external power supply. In some prior art configurations, in order to meet Intrinsic Safety requirements, the output circuitry 158 requires a separate isolated power supply and/or other isolation techniques. However, in one example configuration, the output circuitry 158 is powered with power received through loop 160.

Figure 3:
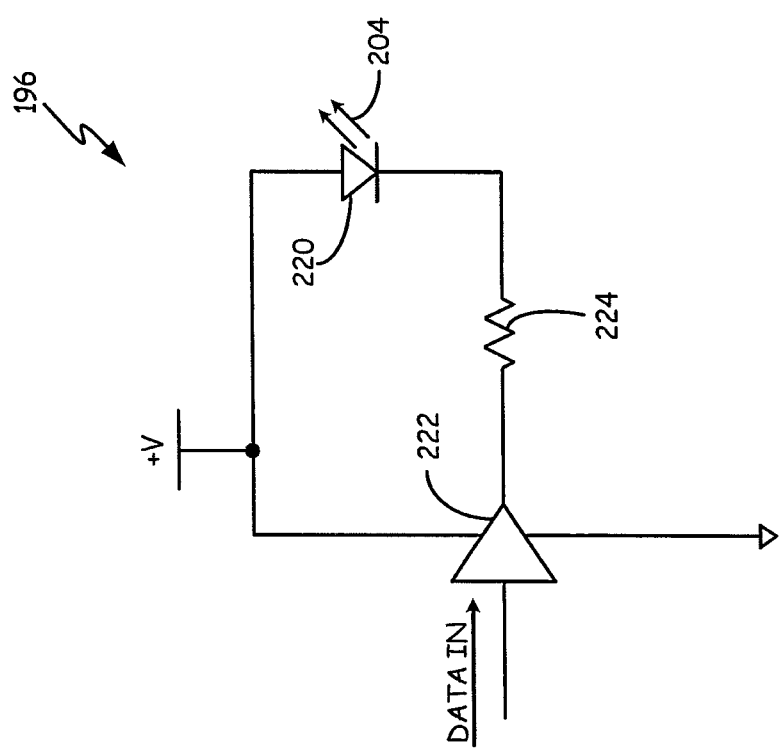
FIG. 3 is a schematic diagram of optical isolator transmit circuitry.
Figure 4:
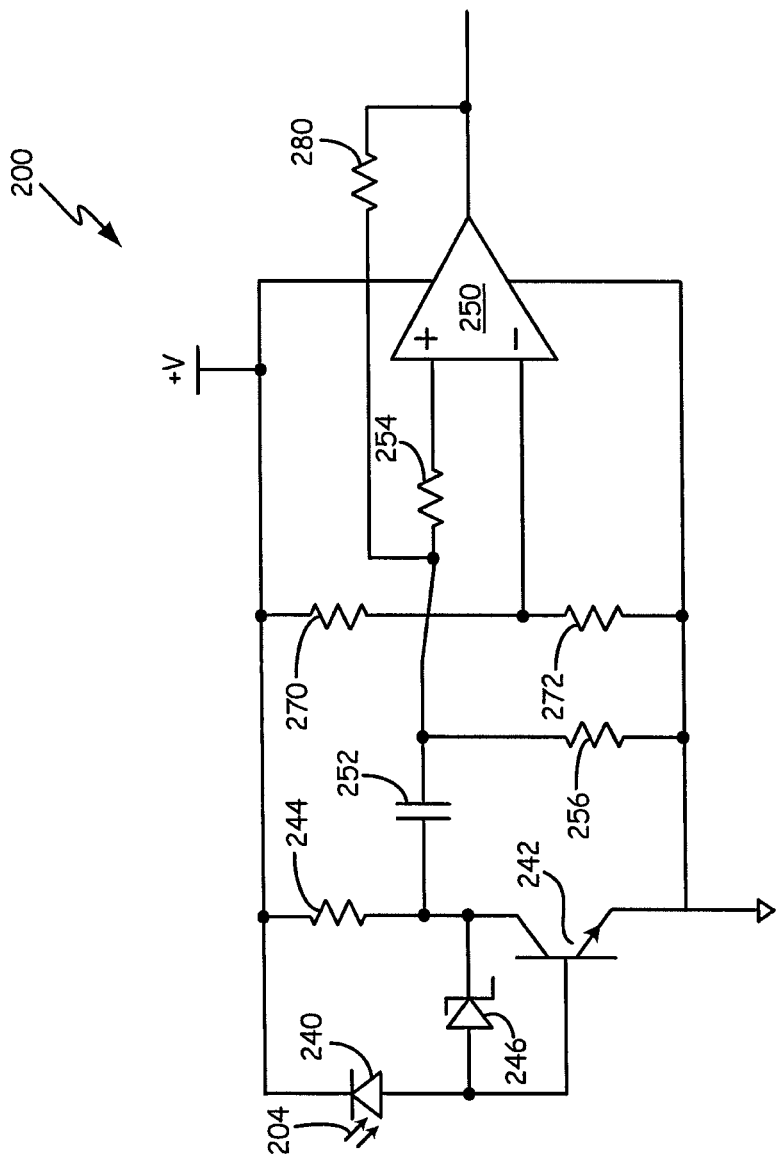
FIG. 4 is a schematic diagram of optical isolator receive circuitry.

FIGS. 3 and 4 are simplified schematic diagrams of optical transmit circuitry 196 and optical receive circuitry 200, respectively, shown in FIG. 2. As discussed below, the transmit and receive circuitry are implemented using architecture which operates in a normally "off" or low power condition thereby using power when necessary. More specifically, the circuitry is configured such that the transmit and receive circuits 196, 200 only consume substantial power when transmitting a low logic level (for example a logical "0") therebetween. A high logic level, i.e. a logical "1", is transmitted between circuits 196 and 200 when no optical signal 204 is present. Thus, when transmitting a digital high value, the transmit circuitry 196 is off. Further, receive circuitry 200 is configured to operate in a low power state when optical signal 204 is not received. Note that in such a configuration, equal rise and fall times in the signal should be considered in order to prevent skewing of the signal.

In the embodiment shown in FIG. 3, an infrared diode 220 is driven by a gate 222 through a resistance 224. During an idle condition, when the gate 222 is logic high, diode 220 does not conduct current. During communication, diode 220 is driven with the necessary current, in this case about 3 mA during each "0" bit. Thus, for example, if the maximum duty cycle is 5%, the average current is about 150 µA. Gate 222 receives a digital bit stream signal from measurement circuitry 154 and responsively powers optical source (diode) 220. When energized, diode 220 transmits optical signal 204 to receive circuitry 200.

In the embodiment shown in FIG. 4, signal 204 is received by optical sensor (diode) 240. As illustrated in FIG. 4, diode 240 is coupled to a power supply and the base of transistor 242. Transistor 242 couples to the power supply through resistance 244. Further, the collector of transistor 242 is connected to diode 240 through a schottky diode 246. The collector of transistor 242 is AC coupled to the non-inverting input of differential comparator 250 through capacitor 252. The non-inverting input of comparator 250 is also connected to electrical ground through resistors 254 and 256. The inverting input of comparator 250 couples to the power supply through resistor 270 and to electrical ground through resistor 272. Positive feedback is provided through resistor 280.

During operation, diode 240 is normally in an idle state and not receiving a signal 204 and therefore not conducting current. During this idle state (logic "1" or high), the current drawn by circuitry 200 is through resistors 270, 272, resistors 280, 256 and the current drawn by the comparator 250. In this specific example, this is about 10 µA, 20 µA, and 130 µA, respectively, for a total of about 160 µA.

When a "0" bit is received, the receive circuitry 200 draws current as a function of a current transfer ratio (CTR) between diodes 220, 240. For example, assuming a drive current of 3 mA applied to diode 220 in FIG. 3, and a current transfer ratio of 60%, after the gain of transistor 242, the current through resistor 244 is about 1.8 mA. Assuming a 5% duty cycle as referenced above, the average current is about 90 µA. Thus, the average current draw of the receive circuitry 200 is about 250 µA.

According to this embodiment, receive circuitry 200 includes 4 primary sections. Diode 240 provides an optical sensor. An amplifier section is provided by transistor 242. An AC coupling section is implemented with capacitor 252. A hysteresis and comparator section is implemented with comparator 250 and resistors 256,280 This section operates as a comparator with hysteresis and latches a received data bit.

In receive circuit 200, schottky bather diode 246 operates to prevent transistor 242 from entering saturation if the received signal 204 is too large. Such saturation of transistor 242 can skew the bit pattern and lead to errors in the received signal. The amplified current from transistor 242 flows through resistor 244 developing a voltage that is AC coupled to the comparator 250 through capacitor 252. The capacitance of capacitor 252 should be selected to balance the amplitude of the coupled signal with the decay time. A lower value of resistance 256 assists in decreasing the decay time, however, this can also load the AC coupled signal. The AC coupled signal produced across resistance 256 must exceed the voltage on the inverting input of comparator 250. The bias voltage on the inverting input of the comparator 250 can be set as desired to arrive at this threshold. The signal strength of the signal through capacitor 252 should be selected based upon the offset voltage of comparator 250 and the desired noise rejection. For example, if the offset voltage of comparator 250 is 10 mV and a noise rejection margin of 20 mV is desired, the inverting input bias should be about 30 mV. The hysteresis feedback provided to comparator 250 is about 60 mV. This is selected as being twice the value of the inverting input such that there is an equal threshold to be reached in both a rising and falling signal. When the output of comparator 250 is low, the non-inverting input will be at 0 volts. When the output of comparator 250 is high, the non-inverting input will be at 60 mV. Resistance 254 limits the current received by the comparator 250 when a negative transition goes below the ground level.

As set forth in the discussion above, the circuitry is configured to reduce power consumption by remaining in a normally off condition and only using significant power when necessary. The circuitry only consumes significant power when transmitting data between the optical isolators, for example, a logic level "0", but does not use substantial power when transmitting a logic level "1". After a bit is transmitted from the transmit circuitry 196 to the receive circuitry 200, the receive circuitry 200 amplifies the received signal using transistor 242 and AC couples the received signal to comparator 250 using capacitor 252. The comparator 250 operates as a zero crossing detector with hysteresis. In this configuration, the comparator 250 latches a data bit. As the circuitry only amplifies one logic level, which is then AC coupled into the following stages, dynamic power consumption is substantially confined to the amplification stage. As noted above, in order to maintain symmetrical rise and fall times, linear amplification should be used. If a symmetrical propagation delay is required, it is important that the gain amplification stage not saturate. Further, the power used is inversely related to the frequency at which data is transmitted. Higher frequencies use less power. The number of bits per data packet also directly effects power consumption. Increased data bits per packet transmitted require increased power consumption.

The above architecture allows each stage to be optimized individually. Preferably, the gain is optimized to overcome the low current transfer ratios of the optical components. Further, the gain stage can be optimized to adjust for variations in the current transfer ratios as well as temperature and isolation effects. The AC coupling stage can be adjusted for the desired operating frequency and also to minimize power dissipation. The zero crossing detector and hysteretic comparator can be set with minimal thresholds to accept signal and reject noise. Preferably, the comparator is selected to minimize power consumption.

Although the present invention has been described with reference to preferred embodiments, workers skilled in the art will recognize that changes may be made in form and detail without departing from the spirit and scope of the invention. Although elements 30 and 32 are specifically referenced as electrodes, these elements can comprise any type of process variable transducer configured to sense or control a process variable. Thus, circuitry 154 in FIG. 2 can be control or measurement circuitry. The term "optical" as used herein includes electromagnetic radiation in the visible region as well as other regions including infrared and ultraviolet. As discussed above, the terms "loop" and "process control loop" include both wired and wireless communication techniques. Thus, the output 160 from output circuitry 158 in FIG. 2 can be a wireless output.

What is claimed is:

1. An industrial process control field device, comprising:
a process variable transducer configured to sense or control a process variable;
field device circuitry configured to couple to the process variable transducer and communicate on an industrial process control loop, the field device circuitry including an optical isolator comprising:
transmit circuitry on a first side of a galvanic isolation configured to transmit an optical signal across the isolation, the optical signal which is pulsed on and off; and
receive circuitry on a second side of the galvanic isolation configured to receive the optical signal and responsively provide a secondary side output based upon the optical signal, the receive circuitry including an optical sensor which enters an "on" state when it receives a pulse in the optical signal and is otherwise in an "off" state, and an amplifier coupled to the optical sensor which only amplifies the secondary side output when the optical sensor enters the "on" state to thereby reduce power consumption, wherein the receive circuitry includes a comparator which provides an output based upon an output from the optical sensor and the output from the optical sensor is AC coupled to the comparator to thereby reduce power consumption.

2. The industrial process control field device of claim 1 wherein the transmit circuitry is normally in a low power state and enters a high power state when transmitting a pulse, wherein the low power state uses less power than the high power state.

3. The industrial process control field device of claim 1 including a capacitor to AC couple the output from the optical sensor to the comparator.

4. The industrial process control field device of claim 1 wherein the comparator operates with hysteresis and latches an output bit.

5. The industrial process control field device of claim 1 wherein the output from the optical sensor is coupled to the comparator through a capacitor coupled to a resistor.

6. The industrial process control field device of claim 1 including a diode coupled to the amplifier prevents the amplifier from entering saturation.

7. The industrial process control field device of claim 1 including a magnetic coil configured to apply a magnetic field to a flow of process fluid and wherein the process variable transducer comprises sense electrodes which sense a resultant EMF in the flow of process fluid which is related to flow rate.

8. A method of communicating data in an industrial process control field device, comprising:
sensing or controlling a process variable with a process variable transducer;
communicating on an industrial process control loop, the communication related to the sensing or controlling;
transmitting data from a first side of galvanic isolation with an optical signal by pulsing the optical signal on and off;
receiving the optical signal with receive circuitry on a second side of galvanic isolation and responsively providing a receive circuit output based upon the optical signal by causing an optical sensor to enter an "on" state when it receives a pulse in the optical signal and otherwise remaining in an "off" state, and amplifying the optical sensor output only when the optical sensor enters the "on" state to thereby reduce power consumption;
comparing the output from the amplifier using a comparator; and
AC coupling the output from the optical sensor to the comparator to thereby reduce power consumption.

9. The method of claim 8 wherein transmitting data uses transmit circuitry which is normally in a low power state and enters a high power state when transmitting a pulse, wherein the low power state uses less power than the high power state.

10. The method of claim 8 including using a capacitor to AC couple the output from the optical sensor to the comparator.

11. The method of claim 8 wherein the comparator operates with hysteresis and is configured to latch an output bit.

12. The method of claim 8 including coupling the output from the optical sensor to the comparator through a capacitor coupled to a resistor.

13. The method of claim 8 including preventing the optical sensor from entering saturation.

14. The method of claim 8 including applying a magnetic field to a flow of process fluid and wherein the process variable transducer comprises electrodes which sense an EMF in the flow of process fluid related to flow rate.

* * * * *